April 14, 1959    M. O. OVERMIRE ET AL    2,881,985
REEL FOR RECEIVING A SPOOL OF FILM
Filed Jan. 4, 1954
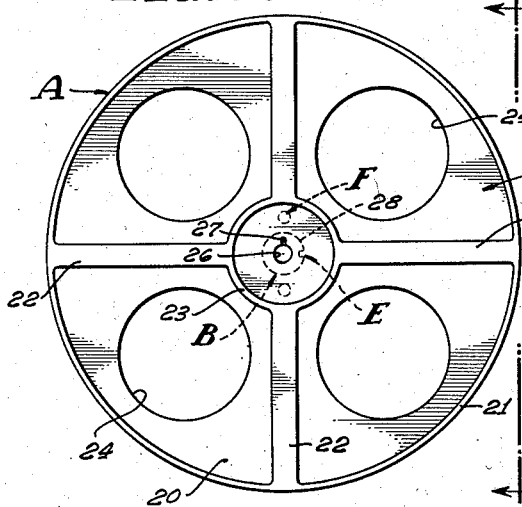
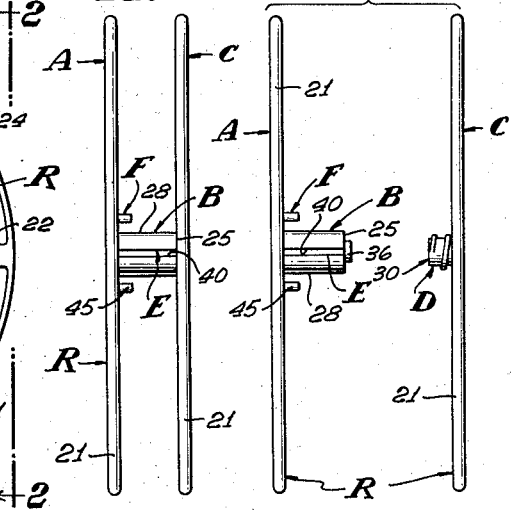
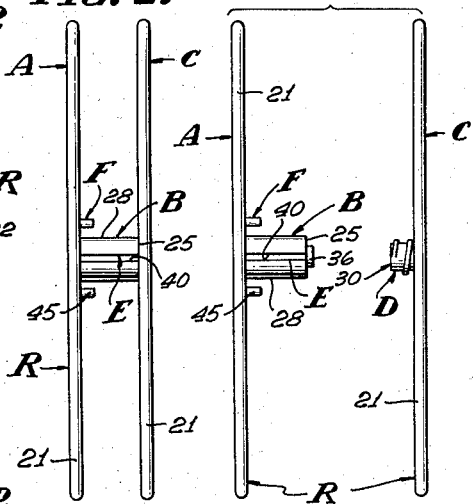
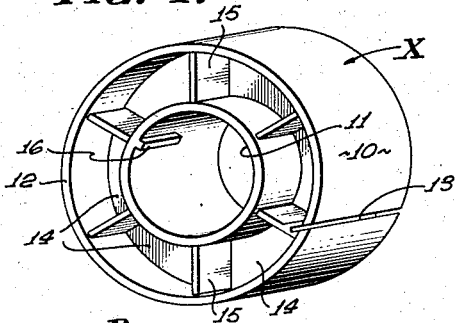
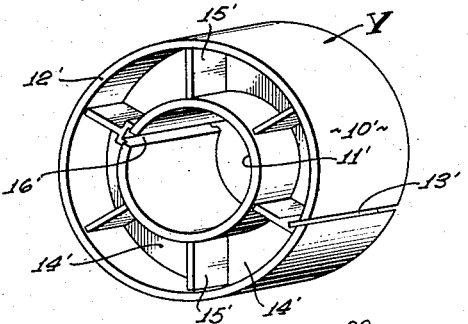
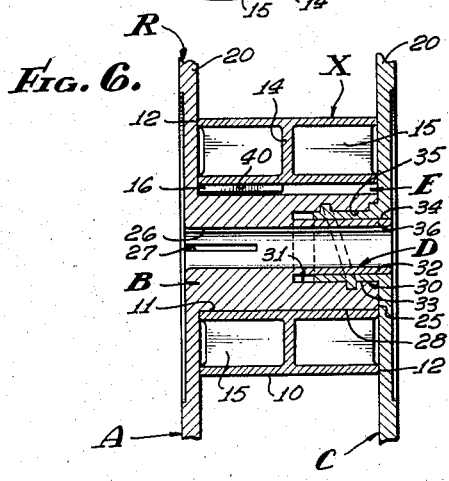
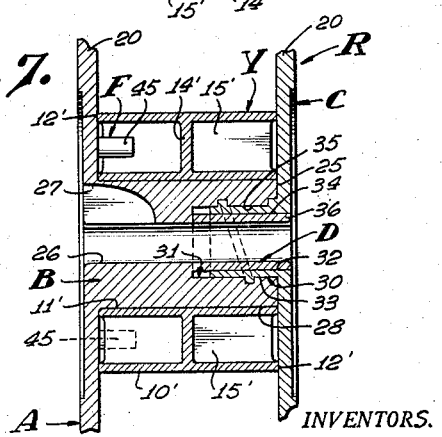
INVENTORS.
MILTON O. OVERMIRE,
GORDON P. DEL FARO,
BY *Wm. H. Maxwell Jr.*
AGENT.

United States Patent Office 2,881,985
Patented Apr. 14, 1959

2,881,985

REEL FOR RECEIVING A SPOOL OF FILM

Milton O. Overmire and Gordon P. Del Faro, Sherman Oaks, Calif., assignors, by mesne assignments, to Harry Teitelbaum and Ben Teitelbaum, Los Angeles, Calif.

Application January 4, 1954, Serial No. 401,794

2 Claims. (Cl. 242—71.8)

This invention relates to a reel assembly unit which is adapted to receive the various spools of film as they are supplied on different cores, and it is a general object of this invention to provide a universal reel of the character referred to which is adapted to handle the various spools of film without modification of either the cores or the reel which is provided by this invention.

This invention is concerned particularly with motion picture film which is universally supplied in spools. The length of film is tightly wound onto a core and is supplied, shipped and stored in flat cylindrical cans. When it is desired to use the film in motion picture equipment, such as a camera or the like, it is necessary to transfer the can of film to a reel which is adapted to be handled by the camera. In order to place the film upon a suitable reel, it is common practice to utilize winding apparatus which simultaneously unwinds the film from the core and onto the reel, and it is also common practice to use split reels which have separable flanges that are adapted to be installed over the spool as it is supplied by the film manufacturer. It is a reel of this latter type with which this invention is concerned. However, the split reels heretofore provided in the industry are limited in their use, since the cores as manufactured by the different manufacturers vary in design and configuration. Because of the difference in core design the split reels that have been provided also vary in design with the result that one reel can be used for only one type of core.

It is a general object of this invention to provide a reel of the character referred to which receives the various core configurations which are now provided and used by the industry. By the present invention a reel is provided which is adapted to be quickly assembled over a spool of film in a most convenient and economical manner.

An object of the present invention is to provide a universal reel of the character referred to which has coupling means adapted to engage and drive the various cores which are used by the film industry. Through the particular coupling means that we have provided, a spool of film may be assembled with the reel of the present invention to have driving engagement with one of the coupling means without interfering with the coupling means provided for the other type of spool.

The various objects and features of my invention will be fully understood from the following detailed description of a typical preferred form and application of our invention, throughout which description reference is made to the accompanying drawings, in which:

Fig. 1 is an end view of the reel of the present invention. Fig. 2 is a side view taken as indicated by line 2—2 on Fig. 1. Fig. 3 is an exploded view of the parts shown in Fig. 2. Fig. 4 is a perspective view of one form of core as provided by the industry. Fig. 5 is a perspective view of the other form of core which is provided by the industry. Fig. 6 is a sectional view through the center of the reel showing the core as illustrated in Fig. 4 applied to the reel which we have provided, and Fig. 7 is a sectional view of the center of the reel showing the core which is illustrated in Fig. 5 applied to the reel of the present invention.

The two types of cores which are provided by the film manufacturers are illustrated in the drawings as cores X and Y. In practice, the film comes in substantial lengths and is wound onto the core forming a spool of film. The cores X and Y are characterized by cylindrical outer walls 10 and 10' and central axial bores 11 and 11', respectively. The walls 10 and 10' and the bores 11 and 11' terminate at end faces 12 and 12' which are flat and normal to the longitudinal axis of the cores and are spaced apart a distance corresponding substantially with the width of the film that is to be wound onto the core. Anchor slots 13 and 13' are provided in the peripheries of the cores X and Y and are formed in the outer walls 10 and 10'. The slots 13 and 13' extend longitudinally of the cores or across the walls from end to end of the core.

The cores generally range from two to three inches in diameter, and are usually molded of plastic material. As shown in Figs. 4 and 5 of the drawings, the end faces 12 and 12' of the cores X and Y are cored leaving central radially disposed webs 14 and 14'. As shown in the drawings, a plurality of longitudinally disposed circumferentially spaced ribs 15 and 15' are formed, and join or connect the peripheral and central portions of the cores X and Y. It will be noted that each rib has an opposite or a diametrically opposed rib or, in other words, the ribs are formed in diametrically opposed pairs. By means of the construction just described the cores are light in weight, are produced of a minimum of material while at the same time they are of substantial strength.

The core X is provided with a longitudinally disposed key-like projection 16 which projects radially inward from the bore 11 as shown in Fig. 4 of the drawings, while the core Y is provided with a longitudinally disposed key-way or channel 16' which is formed in the wall of the bore 11'. It is important to note that there are three pairs of ribs and that the projection 16 or keyway 16' occurs in line with one of the pairs. These two elements 16 and 16' are ordinarily used to cooperate with the coupling means of a particular reel which is employed to handle one type of core only. However, we provide a universal reel which cooperates with either type of core, X or Y, to have driving engagement therewith. In the case of the core X we have provided means which couples with and drives through the projection 16, and in the case of the core Y we have provided means which couples with and drives through the ribs 15'.

The reel R as provided by the present invention involves, generally, a circular flange A, a hub B which is concentric with and projects axially from the flange A, a flange C which is complementary to the flange A in size and shape and which is spaced therefrom by means of the hub B, a means D separably connecting the flanges A and C, a coupling means E adapted to provide driving connection between the reel R and the core X hereinabove described, and a coupling means F adapted to provide driving connection between the reel R and the core Y hereinabove described.

The flanges A and C are preferably like simple flat disc-shaped elements which are concentric with each other and with the axis of the reel R. The flanges are of suitable diameter, and such as to confine the quantity of film which is to be handled by the reel. As shown, each flange has a circular plate 20 which is encompassed by a circular rim 21. Suitable stiffening ribs 22 may be provided and extended radially between the center portion 23 and the rim 21 of each flange. Also, lightening holds 24 can be provided, if desired, between the ribs 22 as clearly illustrated in Fig. 1 of the drawings.

The hub B is an elongate part concentric with the axis of the reel R and preferably formed integrally with the flange A. The hub B projects inwardly from the inward face of the flange A and has a cylindrical bore or passage 26 which is adapted to receive a supporting spindle from the reel handling machine which is to carry the reel. The length of the hub B is preferably slightly greater than the width of the film to be handled by the reel and terminates in a flat end 25 which is normal to the axis of the reel R. A suitable recess 27 is formed in the hub B at the flange A and is adapted to receive the ordinary key-like projections which are provided on all standard film handling machines. Thus, the spindle of the reel handling machinery or equipment has a driving connection with the hub B of the reel R. The hub B has a cylindrical exterior 28 which is adapted to slidably receive the bores 11 and 11' so that the cores X and Y will freely pass over the hub B.

The means D which operably connects the flanges A and C in spaced relationship involves, generally, a boss 30 which projects inwardly from the flange C and a socket 31 in hub B which receives and engages the boss 30. The boss 30 is cylindrical and tubular in cross section, is concentric with the axis of the reel R, and has inner and outer walls 32 and 33 which are concentric with each other. The socket 31 is annular in cross sectional configuration and has inner and outer walls 34 and 35 which correspond substantially with the diameters of the walls 32 and 33, respectively, so that the boss 30 is insertable into the socket 31. The wall 35 of the socket 31 is provided with threads that receive threads on the wall 33 of the boss 30. The threads are preferably multiple pitch threads and are left-handed so that the means D is adapted to be operated quickly and to lock the flanges together during the ordinary operation of the reel R in a right-handed direction. It is to be noted that the annular socket 31 leaves a sleeve-like portion 36 which projects somewhat from the hub B and which terminates at the flange C so that the bore 26 within the hub B is coextensive therewith.

The coupling means E which I have provided is adapted to cooperate with the core X in order to provide a driving engagement between the reel R and the core X. As shown in Figs. 2 and 6 of the drawings, the coupling means E involves an elongate key-way 40 formed in and extending longitudinally of the hub B. The key-way 40 is open at the end 25 of the hub B and is coextensive with the hub and terminates at the flange A. It will be understood how the projection 16 on the core X is slidably engaged in the key-way 40 to impart rotative forces from the reel R to the core X.

The coupling means F of the present invention is adapted to cooperate with the core Y in order to provide a driving engagement between the reel R and the core Y. As illustrated in Figs. 2 and 7 of the drawings, the means F involves one or more drive pins 45 which project inwardly from the flange A on an axis parallel to and spaced from the longitudinal axis of the reel R. In the preferred form of the invention a pair of spaced drive pins 45 are provided. The drive pins are positioned diametrically opposite from each other as clearly shown in Fig. 7 of the drawings, and have driving engagement with the ribs 15'. The pins are rotatively positioned at a right angle to the key-way 40, or at 90° thereto, so that when cores of the X type are used the pins will fall freely between the ribs 15. It is to be understood that there are other cores, for example, cores with an even number of ribs 15, in which case the projection 16 is offset from the position of the ribs. By offsetting the projection, the pins 45 will fall freely between the ribs. It will be clear how the pins 45 engage the ribs 15' to impart rotative force from the reel R to the core Y and how the pins 45 clear the ribs of the core X.

From the foregoing, it will be apparent that we have provided a simple and practical reel which may be universally applied to the various cores which are ordinarily provided by the manufacturers of motion picture film. In order to transfer a can of film to the reel of the present invention, it is merely necessary to disconnect the flanges A and C by relative rotation between the flanges, whereupon they are free to be separated so that the spool of film can be inserted over hub B. The reel that we have provided is adapted to receive either type of core so that it is not necessary to stock or to be supplied with various types of reels. When the film and core is inserted over the hub B it is merely necessary to attach the flange C by means of relative rotation between the elements whereupon the reel R is completely assembled and ready for use.

Having described only a typical preferred form and application of our invention, we do not wish to be limited or restricted to the specific details herein set forth, but wish to reserve to ourselves any variations or modifications that may appear to those skilled in the art and fall within the scope of the following claims:

Having described our invention, we claim:

1. A reel for receiving elongate spools of film having one of two types of cores, one type of core having longitudinally disposed circumferentially spaced ribs and one type of core having a key-like projection, and including, a pair of spaced flanges, a central hub projecting from one of the flanges, a means separably connecting the other flange to the hub, a key-way in the hub and extending longitudinally thereof, and a pin spaced from the axis of the reel and projecting inwardly from one of the flanges, said pin being engageable with one of said ribs of the first mentioned type core to rotatively couple said core with the hub, and said key-way being engageable with said projection of the second mentioned type core to rotatively couple said core with the hub.

2. A reel for receiving elongate spools of film having one of two types of cores, one type of core having longitudinally disposed circumferentially spaced ribs and one type of core having a key-like projection, and including, a pair of spaced flanges, a central hub projecting from one of the flanges with a cylindrical bore extending concentrically therethrough, a means separably connecting the other flange to the hub, a key-way in the hub and extending longitudinally thereof, and a pin spaced from the axis of the reel and projecting inwardly from one of the flanges, said means including a central cylindrical boss projecting from the said other flange and an annular socket in the hub concentric with and surrounding the said bore and receiving the boss, said pin being engageable with one of said ribs of the first mentioned type core to rotatively couple said core with the hub, and said key-way being engageable with said projection of the second mentioned type core to rotatively couple said core with the hub.

References Cited in the file of this patent

UNITED STATES PATENTS

| 873,950 | Koch | Dec. 17, 1907 |
| 1,410,014 | Hurlburt | Mar. 21, 1922 |
| 1,503,896 | Harris | Aug. 5, 1924 |
| 2,476,928 | Thomas | July 19, 1949 |
| 2,615,643 | Barsam, Jr. | Oct. 28, 1952 |

FOREIGN PATENTS

| 576,182 | Great Britain | Mar. 22, 1946 |